United States Patent
Edel

(10) Patent No.: US 9,008,808 B2
(45) Date of Patent: Apr. 14, 2015

(54) CONTROL SYSTEM FOR SAFELY OPERATING AT LEAST ONE FUNCTIONAL COMPONENT

(75) Inventor: Jan Edel, Luedenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 810 days.

(21) Appl. No.: 13/275,975

(22) Filed: Oct. 18, 2011

(65) Prior Publication Data
US 2012/0035750 A1    Feb. 9, 2012

Related U.S. Application Data

(63) Continuation of application No. PCT/EP2010/055864, filed on Apr. 29, 2010.

(30) Foreign Application Priority Data

May 2, 2009 (DE) .......................... 10 2009 019 792

(51) Int. Cl.
    *G05B 9/02*     (2006.01)

(52) U.S. Cl.
    CPC .................................... *G05B 9/02* (2013.01)

(58) Field of Classification Search
None
See application file for complete search history.

(56) References Cited

U.S. PATENT DOCUMENTS

| | | | |
|---|---|---|---|
| 6,980,097 B2 | 12/2005 | Bullinger et al. | |
| 7,765,702 B2 * | 8/2010 | Schirp et al. | .................... 33/1 N |
| 2002/0105428 A1 | 8/2002 | Benson et al. | |
| 2003/0100983 A1 | 5/2003 | Bullinger et al. | |
| 2005/0143960 A1 * | 6/2005 | Recknagel et al. | ........... 702/190 |
| 2007/0063834 A1 | 3/2007 | Bozzone et al. | |
| 2010/0023205 A1 * | 1/2010 | Schmitt | ........................... 701/34 |

FOREIGN PATENT DOCUMENTS

| | | | |
|---|---|---|---|
| DE | 10049911 A1 | | 4/2002 |
| DE | 102004036087 A1 | | 2/2006 |
| WO | WO 2008/006507 | * | 1/2008 |

* cited by examiner

*Primary Examiner* — Sean Shechtman
*Assistant Examiner* — Steven Garland
(74) *Attorney, Agent, or Firm* — Brooks Kushman P.C.

(57) ABSTRACT

A system includes a functional control unit and a controller. The functional control unit is configured to enable and disable operation of a functional component. The controller is configured to receive a sensor signal, evaluate safety quality of the sensor signal, generate an evaluation parameter representing the safety quality of the sensor signal, and output the sensor signal with the evaluation parameter as a pair for receipt by the functional control unit. The functional control unit is configured to control operation of the functional component depending on the safety quality indicated by the evaluation parameter.

20 Claims, 2 Drawing Sheets

CONTROL SYSTEM FOR SAFELY OPERATING AT LEAST ONE FUNCTIONAL COMPONENT

CROSS-REFERENCE TO RELATED APPLICATIONS

This application is a continuation of International Application No. PCT/EP2010/055864, published in German, with an international filing date of Apr. 29, 2010, which claims priority to DE 10 2009 019 792.3, filed May 2, 2009; the disclosures of which are incorporated by reference.

TECHNICAL FIELD

The present invention relates to a control system for safely operating a functional component of a functional control unit in which the control system processes a sensor signal of a sensor and transmits the processed sensor signal to the functional control unit, wherein an operating mode for the functional control unit is determined from the sensor signal in which the functional component can be safely operated.

BACKGROUND

DE 10 2004 036 087 A1 describes such a control system. This control system envisions different operating modes to enable a specific adaptation of the functional components to a respective known operating situation. The operating modes include an inclement weather mode, an off-road mode, a mountain mode, and a freeway mode. Transmission of a valid operating mode takes place with a data bus protocol without directly addressing a receiver. The operating modes are thereby independent of the configuration of different vehicle models. For this reason, the components that transmit the operating mode are not aware of the number and type of receiver components. The adjustments for the functional components corresponding to each operating mode are stored in the control units. The control system thereby enables an adaptation of the functionality to external conditions that are detected by sensors and represented by sensor data. A problem is that the detected sensor data can include faulty data. This control system is not concerned with the recognition of faulty sensor data or other system errors.

The IEC 61508 so-called Safety Requirement Steps (also known as Safety Integrity Levels (SIL)) are designated for evaluating reliability of safety functions of electrical and programmable electronic systems. Derived standards like the ISO 26262 use the ASIL abbreviation for the automobile field. The safety integrity level represents a measure of the functional safety of a system as a function of risk and danger that may result from system operation. Functions or processes with lower risk are constructed by a safety buffer having a lower safety integrity level than processes with higher risk.

The overall function of conventional safety concepts in case of a meaningful fault or malfunction is to transfer by switching to a safer state. This means that at least some safety-critical receivers of data from sensors will lose their entire functionality. In this case, an unavailable degradation concept is detrimental. As such, in the situation where functional safety is no longer sufficient for a specified data receiver, functions and/or receivers connected with the sensor are not to be shut off immediately.

Up to now, in terms of safety concepts for an electronic sensor, in case of a detected error that may lead to damage of the highest safety integrity level specified for an overall function, the usability of the sensor information has been inhibited, for example, by a radical shutdown of the sensor. In this manner, other functions that depend on the same sensor information no longer function because information is missing regarding the remaining level of safety integrity of the delivered sensor information. Without this information, the proven safety integrity level conforming to standards is reduced to null and safety-critical applications have to at least partially discontinue their operation. Valuable availability is hereby lost.

SUMMARY

An object of the present invention is a control system that avoids the aforementioned disadvantages and thereby assures a higher and broader availability of functional components and entire functional groups.

In carrying out the above object and other objects, the present invention provides a system having a functional control unit and a controller. The functional control unit is configured to enable and disable operation of a functional component. The controller is configured to receive a sensor signal, evaluate safety quality of the sensor signal, generate an evaluation parameter representing the safety quality of the sensor signal, and output the sensor signal with the evaluation parameter as a pair for receipt by the functional control unit. The functional control unit is configured to control operation of the functional component depending on the safety quality of the sensor signal indicated by the evaluation parameter.

Also, in carrying out the above object and other objects, the present invention provides a system having a plurality of functional control units each associated with one or more of functional components. Each functional control unit is configured to enable and disable operation of their associated functional components. The system further includes a controller configured to receive a sensor signal, evaluate safety quality of the sensor signal, generate an evaluation parameter representing the safety quality of the sensor signal, and output the sensor signal with the evaluation parameter as a pair for receipt by the functional control units. Each functional control unit is further configured to control operation of the their associated functional components depending on the safety quality of the sensor signal indicated by the evaluation parameter.

Further, in carrying out the above object and other objects, the present invention provides a method. The method includes receiving a sensor signal from a sensor, evaluating safety quality of the sensor signal, generating an evaluation parameter representing the safety quality of the sensor signal, and outputting the sensor signal with the evaluation parameter as a pair to a data bus in communication with a functional control unit, configured to enable and disable operation of a functional component, for receipt by the functional control unit. The method further includes controlling with the functional control unit operation of the functional component depending on the safety quality of the sensor signal indicated by the evaluation parameter.

Embodiments of the present invention are directed to a control system for safely operating functional component(s) of functional control unit(s). Each functional control unit is operable to enable or disable operation (i.e., actuation) of its functional component(s). Each functional component has a safety level. A functional component can be safely operated when using a sensor signal that satisfies its safety level. Conversely, a functional component may not be safely operated when using a sensor signal that does not satisfy its safety level. The control system includes a controller and a data bus. The controller evaluates the quality of a sensor signal from a sensor and generates an evaluation variable representing the safety quality of the sensor signal. The controller outputs the sensor signal with its corresponding evaluation variable to the data bus. The data bus transmits the sensor signal and the evaluation variable to each functional control unit. Each functional control unit controls its functional component(s) depending on the sensor signal and the value of the related evaluation variable. In particular, each functional control unit enables operation of its functional component(s) when the evaluation variable relative to the safety level of the functional component(s) indicates that the functional component(s) may safely operate when using the sensor signal. Conversely, each functional control unit disables operation of its functional component(s) when the evaluation variable relative to the safety level of the functional component(s) indicates that the functional component(s) may not safely operate when using the sensor signal.

A control system in accordance with embodiments of the present invention includes a controller that is configured to evaluate the safety quality of a sensor signal, generate an evaluation parameter that represents the safety quality of the sensor signal, and transmit the sensor signal with the corresponding evaluation parameter over a data bus for receipt by one or more functional control units. Each functional control unit is associated with one or more of its own functional components. Each functional control unit controls its functional components based on the currently received value of the sensor signal and the value of the associated evaluation parameter.

In accordance with embodiments of the present invention, an evaluation parameter as a sufficient self-protective accompanying data input is introduced. The receiver of sensor data of a sensor can recognize with the assistance of the evaluation parameter the safety integrity level of the sensor data in the normal case as given or in certain error situations as residual. Using the evaluation parameter in comparison with its own safety requirements the receiver is in a position to decide on safety-related defensible grounds whether to continue carrying out its function. The availability probability of the overall function thereby increases substantially.

In embodiments of the present invention, on the sensor side, the associated remaining safety integrity level that results from cutting off the error-affected component may naturally have been established for the error case.

In embodiments of the present invention, the evaluation parameter can be an 8 or 16 bit digital data word for which a word agreed upon between the sensor and receiver indicates a definite safety integrity level.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
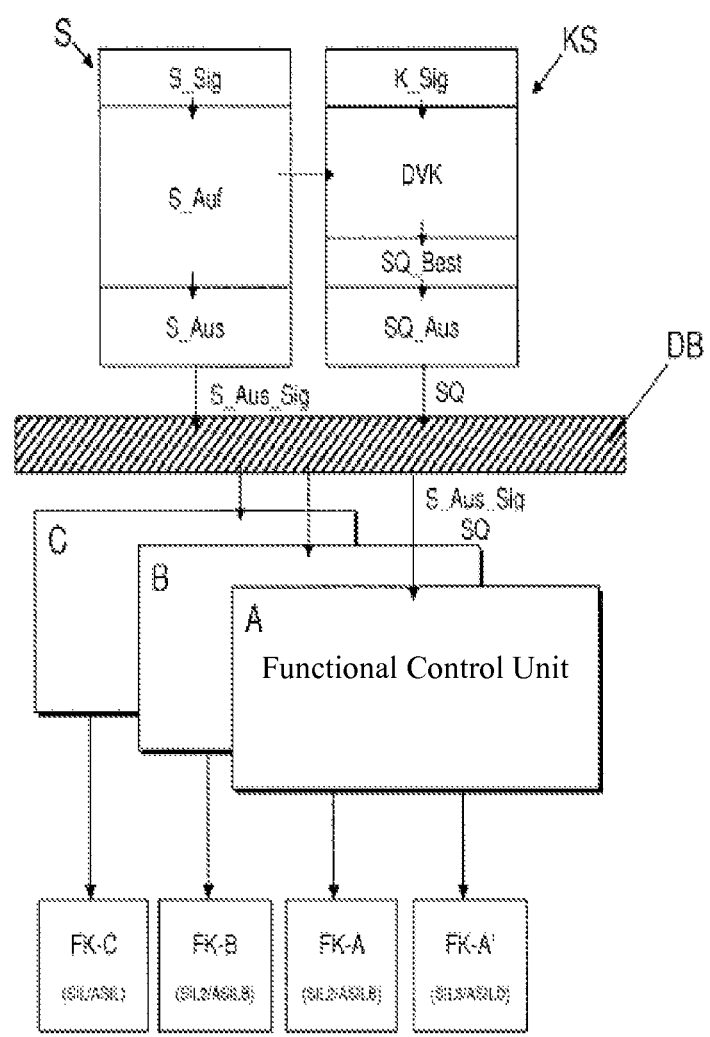
FIG. 1 illustrates a schematic diagram of a control system in accordance with an embodiment of the present invention.

Referring now to FIG. 1, a schematic diagram of a control system in accordance with an embodiment of the present invention is shown. The control system includes a first sensor S and a second sensor KS. First sensor S is configured to sense some element (i.e., pick up a sensor measurement) and generate a corresponding sensor signal S_Sig. Second sensor KS is configured to sense the same element as first sensor S (i.e., pick up the same sensor measurement as first sensor S) and generate a corresponding sensor signal K_Sig. Second sensor KS is designated as a monitoring sensor KS as second sensor KS senses the same element as first sensor S.

The control system further includes a controller having first and second portions. The first controller portion is configured to receive sensor signal S_Sig from first sensor S. The first controller portion includes a sensor signal processor S_Auf. Sensor signal processor S_Auf processes and converts sensor signal S_Sig of first sensor S to a digital sensor signal S_Aus_Sig. The first controller portion further includes a sensor signal output S_Aus. Sensor signal output S_Aus is configured to output sensor signal S_Aus_Sig.

The second controller portion is configured to receive monitoring signal K_Sig from monitoring sensor KS. The second controller portion includes a diagnosis, comparison, and monitoring processor DVK. In addition to being configured to receive monitoring signal K_Sig of monitoring sensor KS, processor DVK is configured to receive sensor signal S_Aus_Sig of first sensor S from sensor signal processor S_Auf of first controller portion. Processor DVK processes monitoring signal K_Sig and compares monitoring signal K_Sig with sensor signal S_Aus_Sig of first sensor S. Processor DVK evaluates sensor signal S_Aus_Sig of first sensor S and monitoring signal K_Sig of monitoring sensor KS with respect to their plausibility. In turn, an evaluation parameter determination SQ_Best of processor DVK generates an evaluation parameter SQ indicative of the quality and trustworthiness of sensor signal S_Aus_Sig of first sensor S. The second controller portion further includes an evaluation parameter output SQ_Aus. Evaluation parameter output SQ_Aus is configured to output evaluation parameter SQ.

The control system further includes a data bus DB. Data bus DB is configured to receive sensor signal S_Aus_Sig from sensor signal output S_Aus of the first controller portion. Data bus DB is further configured to receive evaluation parameter SQ from evaluation parameter output SQ_Aus of the second controller portion.

The generation of an evaluation parameter SQ using the sensor signal of monitoring sensor KS is an example of the operation of the control system. Other procedures for generating an evaluation parameter SQ can be provided in accordance with embodiments of the present invention either by plausibility testing within an individual sensor or with the aid of common evaluations of a plurality of different sensor measurements. The evaluations can be carried out with the aid of hardware components or in combination with hardware and software means, wherein these means are assigned to one or more sensors, or can be implemented by independent computer hardware.

As described, the controller generates an evaluation parameter SQ for each sensor signal S_Aus_Sig and transmits sensor signal S_Aus_Sig with the corresponding evaluation parameter SQ to data bus DB. That is, each sensor signal S_Aus_Sig has an assigned evaluation parameter SQ and the controller transmits these two elements in pairs to data bus DB. Evaluation parameter SQ of a sensor signal S_Aus_Sig characterizes the quality of the respective sensor signal S_Aus_Sig conforming to safety standards.

The control system further includes a plurality of functional control units A, B, and C. Each functional control unit A, B, C includes at least one functional component. For instance, functional control unit A includes two functional components FK-A and FK-A'; functional control unit B includes a functional component FK-B; and functional control unit C includes a functional component FK-C. Functional control units A, B, C are configured to control their respective functional components FK-A, FK-A', FK-B, FK-C. Functional control units A, B, C respectively implement one or more functions during the control of functional components FK-A, FK-A', FK-B, FK-C and can for example be implemented by functional procedures in a computer system or also respectively by an individual control unit.

Functional components FK-A, FK-A', FK-B, FK-C are generally actuators or the like such as motors or valves provided to carry out specific functions. One or more of functional components FK-A, FK-A', FK-B, FK-C may be other types of devices such as indicator devices. Functional components FK-A, FK-A', FK-B, FK-C are shown in FIG. 1 as block symbols. Each block includes in parentheses the safety integrity level (SIL/ASIL, SIL2/ASILB, SIL3/ASILD) required for carrying out the respective function of that functional component safely. The safety integrity level increases as the corresponding numeral level increases. For instance, the safety integrity level SIL3/ASILD is higher than the safety integrity level SIL2/ASILB.

As shown in FIG. 1 as an example, functional components FK-A and FK-A' of functional control unit A respectively require safety integrity level SIL2/ASILB and SIL3/ASILD for carrying out their functions. As such, functional components FK-A and FK-A' require different safety integrity levels. Functional component FK-B requires a safety integrity level SIL2/ASILB to carry out its function. Functional component FK-C requires a safety integrity level SIL/ASIL to carry out its function. The safety integrity level SIL/ASIL may be designated so low such that functional component FK-C may carry out its function essentially without any safety regulation.

The controller provides sensor signal S_Aus_Sig and the respectively assigned evaluation parameter SQ via data bus DB to each functional control unit A, B, C. As such, functional control units A, B, C are supplied with the signals of first sensor S as input quantities which the functional control units receive as processed sensor signals S_Aus_Sig in parallel from data bus DB. Evaluation parameters SQ respectively assigned to the sensor signals S_Aus_Sig are likewise distributed in parallel to functional control units A, B, C from data bus DB.

Based on evaluation parameter SQ assigned to a given sensor signal S_Aus_Sig, each functional control unit A, B, C decides independently on safety grounds whether or not the assigned functional components FK-A, FK-A', FK-B, FK-C may be controlled using sensor signal S_Aus_Sig. For instance, functional control unit A decides based on evaluation parameter SQ corresponding to sensor signal S_Aus_Sig whether functional components FK-A and/or FK-B may be controlled using the sensor signal S_Aus_Sig. Likewise, functional control unit B decides based on evaluation parameter SQ whether functional component FK-B may be controlled using the sensor signal S_Aus_Sig.

Evaluation parameter SQ has a value that directly represents a safety integrity level. For instance, evaluation parameter SQ may represent one of safety integrity levels SIL/ASIL, SIL2/ASILB, and SIL3/ASILD. Alternatively, evaluation parameter SQ can assign a safety integrity level to functional control units A, B, C with negligible computation effort.

If for example evaluation parameter SQ corresponds to safety integrity level SIL3/ASILD, then evaluation parameter SQ indicates that the quality of sensor signal S_Aus_Sig is sufficient for safe operation of a functional component associated with each of safety integrity levels SIL/ASIL, SIL2/ASILB, and SIL3/ASILD. Similarly, if evaluation parameter SQ corresponds to safety integrity level SIL2/ASILB, then evaluation parameter SQ indicates that the quality of sensor signal S_Aus_Sig is sufficient for safe operation of a functional component associated with each of safety integrity levels SIL/ASIL and SIL2/ASILB, but not with safety integrity level SIL3/ASILD. Likewise, if evaluation parameter SQ corresponds to safety integrity level SIL/ASIL, then evaluation parameter SQ indicates that the quality of sensor signal S_Aus_Sig is sufficient for safe operation of a functional component associated with only safety integrity level SIL/ASIL and not with either of safety integrity levels SIL2/ASILB and SIL3/ASILD.

As such, for example, if evaluation parameter SQ corresponds to a safety integrity level of SIL2/ASILB, then evaluation parameter SQ notifies functional control unit A that the quality of sensor signal S_Aus_Sig is sufficient for the safe operation of functional component FK-A but is not sufficient for the same operation of functional component FK-A' (functional component FK-A' requires the relatively higher safety integrity level SIL3/ASILD). Functional control unit A thereby continues to enable the operation of functional component FK-A while disabling the operation of functional component FK-A'. The value SIL2/ASILB of evaluation parameter SQ in this example is sufficient for functional control units B and C to enable the operation of functional components FK-B and FK-C.

If evaluation parameter SQ is subsequently restricted to a value corresponding to a safety integrity level less than SIL2/ASILB (such as SIL/ASIL), then functional control unit B disables the operation of functional components FK-B. As a result, in this case, only functional component FK-C remains enabled by functional control unit C for operation as functional component FK-C has no particular safety relevance based on its assigned safety integrity level SIL/ASIL.

This results in a staged degradation based on a quality classification of the sensor signals as the sensor signals are generated. Functional control units A, B, C make decisions automatically for themselves through the operation of their associated functional components FK-A, FK-A', FK-B, FK-C. The type and number of functional control units A, B, C connected with data bus DB thus do not need to be known by a central instance such as the controller of the control system and can easily be increased without affecting the operation of the control system.

Figure 2:
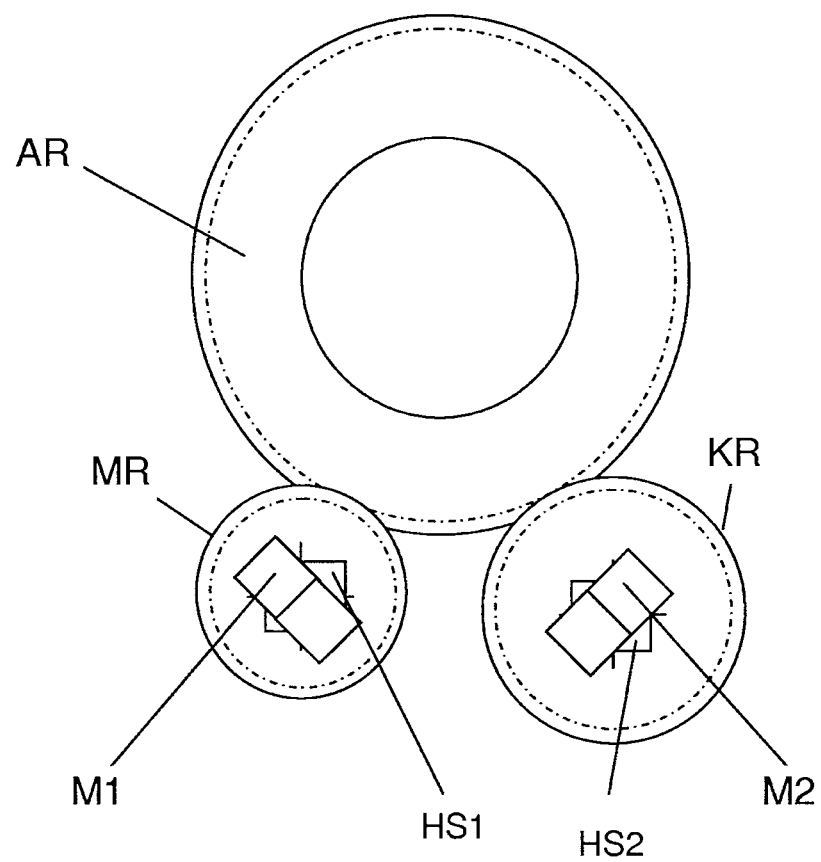
FIG. 2 illustrates an embodiment of a rotational angle sensor based control system in accordance with an embodiment of the present invention.

Referring now to FIG. 2, with continual reference to FIG. 1, an embodiment of a rotational angle sensor based control system in accordance with an embodiment of the present invention is shown. This control system includes a rotational angle sensor that operates according to the nonius principle. Such a rotational angle sensor is described in DE 10 2006 023 286 A1 (corresponds to U.S. Pat. No. 7,765,702).

The rotational angle sensor includes a drive wheel AR (i.e., a drive gear AR), a measurement wheel MR (i.e., a measurement wheel MR), and a monitoring wheel KR (i.e., a monitoring wheel KR). Drive wheel AR is connected to a steering wheel shaft (not shown) whose rotational position is to be monitored. Drive wheel AR, measurement wheel MR, and monitoring wheel KR are toothed wheels. Measurement wheel MR and monitoring wheel KR are smaller than driving wheel AR. Measurement wheel MR and monitoring wheel KR have different radii and thereby also have a different number of teeth. Measurement wheel MR and monitoring wheel KR engage drive wheel AR. Measurement wheel MR includes a permanent bar magnet M1 mounted on its upper side. Likewise, monitoring wheel KR includes a permanent bar magnet M2 mounted on its upper side. Measurement wheel MR and monitoring wheel KR are respectively associated with stationary Hall sensors HS1 and HS2. Sensor HS1 detects the rotational position of magnet M1 to thereby detect the rotational position of measurement wheel MR. Likewise, sensor HS2 detects the rotational position of magnet M2 to thereby detect the rotational position of monitoring wheel KR.

During a rotation of the steering wheel shaft, drive wheel AR drives both measurement wheel MR and monitoring wheel KR. Measurement wheel MR and monitoring wheel KR rotate through different rotational angles as wheels MR and KR have different radii and a different number of teeth.

As described, sensors HS1 and HS2 respectively detect the rotational angle of measurement wheel MR and monitoring wheel KR. As a result, it can be checked whether the rotational angle of monitoring wheel KR is in a plausible ratio with respect to the rotational angle of measurement wheel MR. If the plausibility check is verified then a correct operation of both angle sensors, and thus a correct angle detection, can be assumed for the shaft.

The measurement of two rotational angles by measurement wheel MR and monitoring wheel KR according to the nonius principle enables the measurement of the angular position of drive wheel AR over a plurality of revolutions, but only insofar as both individually detected rotational angles are trustworthy.

If during operation the plausible evaluation of monitoring wheel KR ceases to apply, e.g., due to an internal error of the associated sensor HS2, then with the aid of an evaluation parameter a safety integrity level for the calculated sensor data can nonetheless be stated even with lesser confidence. Therefore, at least such functions can be implemented for which the relative detected rotational angle of measurement wheel MR is sufficient. During use of this rotational angle sensor as a steering angle sensor in a motor vehicle, it is still possible to allow the functions that are not safety-critical or are less critical which require the steering angle. It must then not be shut off or restricted as it would necessarily be without evaluation of evaluation parameter SQ.

REFERENCE SYMBOLS

For FIG. 1:
A, B, C functional control units
DB data bus
DVK diagnosis, comparison, and control processor
FK-A, FK-A', FK-B, FK-C functional components
KS monitoring sensor
K_Sig monitoring sensor signals
S sensor
S_Auf sensor signal preparation
S_Aus sensor signal output
S_Sig sensor signals
S_Aus_Sig (processed) sensor signals
SIL/ASIL, SIL2/ASILB, SIL3/ASILD safety integrity level
SQ evaluation parameters
SQ_Aus evaluation parameter output
SQ_Best evaluation parameter determination
For FIG. 2:
AR drive wheel
HS1, HS2 hall sensors
KR monitoring wheel (gear)
MR measurement wheel (gear)
M1, M2 permanent magnets While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A system comprising:
a functional control unit configured to enable and disable operation of a functional component; and
a controller configured to receive a sensor signal, evaluate safety quality of the sensor signal, select and generate an evaluation parameter from at least three different parameters, each parameter representing a different one of a plurality of predetermined standard-compliant safety levels corresponding to the safety quality of the sensor signal, and output the sensor signal with the evaluation parameter as a pair for receipt by the functional control unit;
wherein the functional control unit is configured to control operation of the functional component depending on the safety level corresponding to the safety quality of the sensor signal indicated by the evaluation parameter.

2. The system of claim 1 wherein:
the functional component has a safety level and can be safely operated when using a sensor signal having a safety quality satisfying the safety level of the functional component;
wherein the functional control unit is configured to enable operation of the functional component when the evaluation parameter is indicative of the safety level corresponding to the safety quality of the sensor signal satisfying the safety level of the functional component.

3. The system of claim 1 wherein:
the functional component has a safety level and can be safely operated when using a sensor signal having a safety quality satisfying the safety level of the functional component;
wherein the functional control unit is configured to disable operation of the functional component when the evaluation parameter is indicative of the safety level corresponding to the safety quality of the sensor signal not satisfying the safety level of the functional component.

4. The system of claim 1 wherein:
the controller is configured to generate the evaluation parameter based on a plausibility comparison of the sensor signal with known data.

5. The system of claim 1 further comprising:
a data bus configured to receive the sensor signal with the evaluation parameter from the controller and output the sensor signal with the evaluation parameter to the functional control unit.

6. The system of claim 1 further comprising:
a first sensor configured generate the sensor signal based on a sensed element and provide the sensor signal to the controller.

7. The system of claim 6 further comprising:
a monitoring sensor configured to generate a monitoring signal based on the sensed element and provide the monitoring signal to the controller;
wherein the controller is configured to generate the evaluation parameter representing the safety quality of the sensor signal based on a comparison between the sensor signal and the monitoring signal.

8. The system of claim 7 wherein:
the sensed element is a drive wheel, the first sensor is a measurement wheel, and the monitoring sensor is a monitoring wheel;
wherein the measurement wheel and the monitoring wheel each engage the drive wheel such that the measurement wheel and the monitoring wheel rotate as the drive wheel rotates.

9. The system of claim 1 wherein:
the evaluation parameter includes a value indicative of the safety level corresponding to the safety quality of the sensor signal.

10. A system comprising:
a plurality of functional control units each associated with one or more of functional components, wherein each functional control unit is configured to enable and disable operation of their associated functional components; and
a controller configured to receive a sensor signal, evaluate safety quality of the sensor signal, select and generate an evaluation parameter from at least three different parameters, each parameter representing a different one of a plurality of predetermined standard-compliant safety integrity levels corresponding to the safety quality of the sensor signal, and output the sensor signal with the evaluation parameter as a pair for receipt by the functional control units;
wherein each functional control unit is further configured to control operation of the their associated functional components depending on the safety integrity level corresponding to the safety quality of the sensor signal indicated by the evaluation parameter.

11. The system of claim 10 wherein:
each functional component has a safety level and can be safely operated when using a sensor signal having a safety quality satisfying the safety level of the functional component;
wherein each functional control unit is further configured to enable operation of a functional component when the evaluation parameter is indicative of the safety level corresponding to the safety quality of the sensor signal satisfying the safety level of the functional component.

12. The system of claim 10 wherein:
each functional component has a safety level and can be safely operated when using a sensor signal having a safety quality satisfying the safety level of the functional component;
wherein each functional control unit is configured to disable operation of a functional component when the evaluation parameter is indicative of the safety level corresponding to the safety quality of the sensor signal not satisfying the safety level of the functional component.

13. The system of claim 10 wherein:
the controller is further configured to generate the evaluation parameter based on a plausibility comparison of the sensor signal with known data.

14. The system of claim 10 further comprising:
a data bus configured to receive the sensor signal with the evaluation parameter from the controller and output the sensor signal with the evaluation parameter to the functional control units.

15. The system of claim 10 further comprising:
a first sensor configured generate the sensor signal based on a sensed element and provide the sensor signal to the controller.

16. The system of claim 15 further comprising:
a monitoring sensor configured to generate a monitoring signal based on the sensed element and provide the monitoring signal to the controller;
wherein the controller is further configured to generate the evaluation parameter representing the safety quality of the sensor signal based on a comparison between the sensor signal and the monitoring signal.

17. The system of claim 10 wherein:
the evaluation parameter includes a value indicative of the safety level corresponding to the safety quality of the sensor signal.

18. A method comprising:
receiving a sensor signal from a sensor;
evaluating safety quality of the sensor signal;
selecting and generating an evaluation parameter from at least three different parameters, each parameter representing a different one of a plurality of predetermined standard-compliant safety levels corresponding to the safety quality of the sensor signal;
outputting the sensor signal with the evaluation parameter as a pair to a data bus in communication with a functional control unit, configured to enable and disable operation of a functional component, for receipt by the functional control unit; and
controlling with the functional control unit operation of the functional component depending on the safety level corresponding to the safety quality of the sensor signal indicated by the evaluation parameter.

19. The method of claim 18 wherein the functional component has a safety level and can be safely operated when using a sensor signal having a safety quality satisfying the safety level of the functional component, the method further comprising:
enabling with the functional control unit operation of the functional component when the evaluation parameter is indicative of the safety level corresponding to the safety quality of the sensor signal satisfying the safety level of the functional component.

20. The method of claim 18 wherein the functional component has a safety level and can be safely operated when using a sensor signal having a safety quality satisfying the safety level of the functional component, the method further comprising:
disabling with the functional control unit operation of the functional component when the evaluation parameter is indicative of the safety level corresponding to the safety quality of the sensor signal not satisfying the safety level of the functional component.

* * * * *